(12) United States Patent
Kim (10) Patent No.: US 8,350,632 B1
(45) Date of Patent: Jan. 8, 2013

(54) ENERGY-CONSERVING DRIVER FOR REACTIVE LOADS

(75) Inventor: Jang Dae Kim, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 357 days.

(21) Appl. No.: 12/590,310

(22) Filed: Nov. 5, 2009

(51) Int. Cl.
  *H03B 5/18* (2006.01)
(52) U.S. Cl. .............................. 331/117 FE; 331/117 R
(58) Field of Classification Search ............. 331/117 R, 331/117 FE, 167; 323/225
  See application file for complete search history.

(56) References Cited

U.S. PATENT DOCUMENTS

| | | | |
|---|---|---|---|
| 6,166,527 A * | 12/2000 | Dwelley et al. | 323/222 |
| 6,972,543 B1 | 12/2005 | Wells | |
| 7,242,168 B2 * | 7/2007 | Muller et al. | 323/222 |
| 7,944,191 B2 * | 5/2011 | Xu | 323/259 |
| 2010/0207455 A1 * | 8/2010 | Erickson et al. | 307/82 |

OTHER PUBLICATIONS

N.Z. Yahaya, et al., "A Review on Design Considerations & Limitations of Resonant Gate Drive Circuit in VHF Operations", Engineering Letter, May 22, 2009, 9 pages.

Dragan Maksimovic, "A MOS Gate Drive with Resonant Transitions", 1991 IEEE, p. 527-532.
Steven C. Chan, et al., "Distributed Differential Oscillators for Global Clock Networks", IEEE Journal of Solid-State Circuits, vol. 41, No. 9, Sep. 2006, p. 2083-2094.
Yuhui Chen, et al., "A Resonant MOSFET Gate Driver with Efficient Energy Recovery", IEEE Transactions on Power Electronics, vol. 19, No. 2, Mar. 2004, p. 470-477.

* cited by examiner

*Primary Examiner* — Joseph Chang
*Assistant Examiner* — Jeffrey Shin
(74) *Attorney, Agent, or Firm* — Wade J. Brady, III; Frederick J. Telecky, Jr.

(57) ABSTRACT

A dipole oscillation tank circuit includes a first capacitive structure, an inductive structure, and a second capacitive structure connected in series. The tank circuit transfers electric energy back and forth between the capacitive structures in dipole oscillation cycles. A renewal circuit injects energy into the tank circuit to replenish energy lost during the oscillation cycles. A switch is connected in parallel across the first capacitive structure and in parallel across the inductive structure and the second capacitive structure. During one phase of the oscillation cycles, the switch is opened for current to flow through the first capacitive structure and the inductive structure, and then closed to bypass the first capacitive structure. During another phase of the oscillation cycles, the switch is closed to bypass the first capacitive structure and then opened for current to flow through the first capacitive structure and the inductive structure.

20 Claims, 5 Drawing Sheets

ENERGY-CONSERVING DRIVER FOR REACTIVE LOADS

TECHNICAL FIELD

This disclosure is generally directed to electronic circuits for driving reactive loads. More specifically, this disclosure is directed to an energy-conserving driver for reactive loads, such as capacitive or inductive loads.

BACKGROUND

Logic circuits routinely use complimentary metal oxide semiconductor (CMOS) technology because of its near-zero static power consumption and other virtues. Loads in CMOS circuits are often capacitive, and the capacitive loads are often driven by CMOS drivers. In conventional CMOS drivers, p-channel MOS (PMOS) transistors are often used to pull up a capacitive load to a higher voltage such as to a supply voltage or "$V_{DD}$," and n-channel MOS (NMOS) transistors are often used to pull down the capacitive load to a lower voltage such as to ground or "$V_{SS}$." One problem is that power is often dissipated in CMOS drivers since the driving transistors are usually resistive. The dynamic power consumption of CMOS circuits is typically a major challenge in building large digital systems.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged devices or systems.

Figure 1:
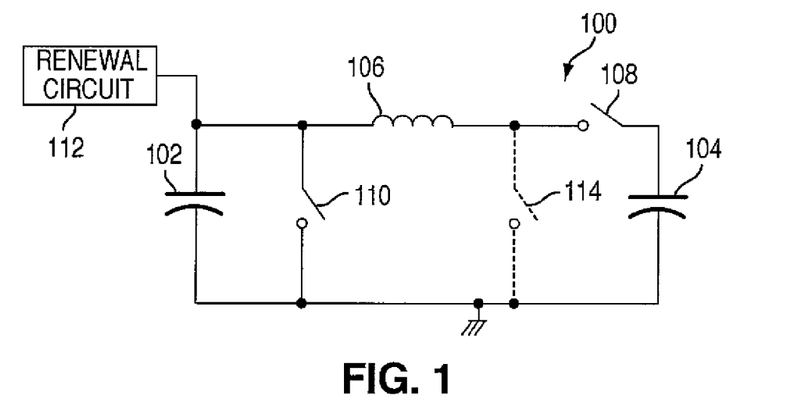
FIGS. 1 through 3 illustrate example energy-conserving reactive drivers according to this disclosure.
Figure 2:
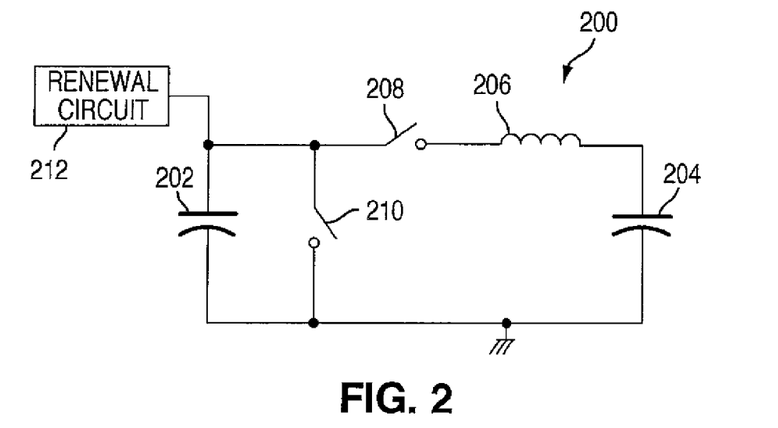
Figure 3:
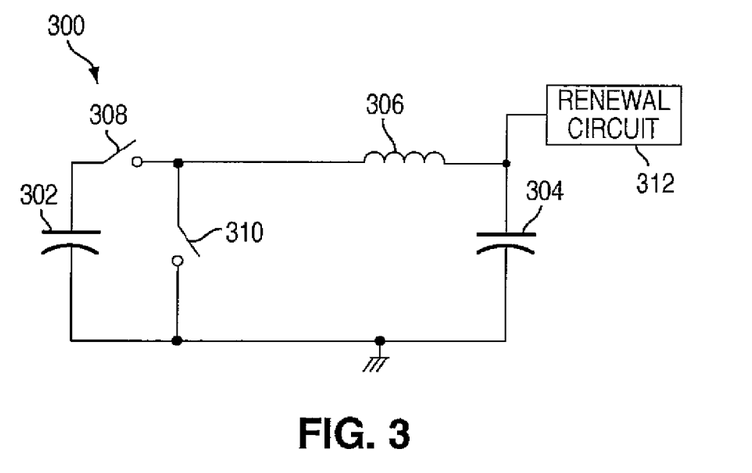

FIGS. 1 through 3 illustrate example energy-conserving reactive drivers according to this disclosure. The embodiments of the reactive drivers shown in FIGS. 1 through 3 are for illustration only. Other embodiments of the reactive drivers could be used without departing from the scope of this disclosure.

As shown in FIG. 1, a reactive driver 100 includes a first capacitor 102, an inductor 106, and a second capacitor 104 coupled in series. The reactive driver 100 also includes a switch 108 coupled in series with the first capacitor 102, the inductor 106, and the second capacitor 104. The reactive driver 100 further includes a switch 110 coupled in parallel across the capacitor 102 and in parallel across the capacitor 104, the inductor 106, and the switch 108. The capacitance of the capacitor 102 could be less than that of the capacitor 104.

In this example, each of the capacitors 102-104 may represent any suitable capacitor or capacitive structure. For example, the capacitor 104 could represent a capacitive clock network, such as a clock bus, that provides clock signals to other components in a processor or other device or system. In these embodiments, the capacitor 102 could represent a complimentary clock network. The capacitor 104 could represent any other suitable capacitive load, and the capacitor 102 could represent any other suitable capacitive structure. Also, the inductor 106 represents any suitable inductive structure having any suitable inductance. In addition, the switches 108-110 represent any suitable switching devices, such as MOS transistors.

In this example embodiment, the capacitors 102-104 and the inductor 106 form a C-L-C dipole oscillation tank circuit. An electric energy (Q*V/2) can be stored on one capacitor 102 and then transferred, via the inductor 106, to the other capacitor 104 before being transferred back to the capacitor 102. This creates oscillations in the tank circuit, where the stored energy is repeatedly transferred back and forth between the capacitors 102-104. The tank circuit is said to be a "dipole" oscillation circuit since the electric energy (Q*V/2) associated with a charge (Q) and an accompanying voltage (V) is transferred back and forth between the two capacitors. As described below, the switches 108-110 can be used to support the dipole oscillation operation in the tank circuit.

In FIG. 1, the overall loop capacitance $C_{TOTAL}$ of the circuit can be expressed as:

$$C_{TOTAL} = \frac{C_1 \times C_2}{C_1 + C_2} \quad (1)$$

where $C_1$ denotes the capacitance of the capacitor 102 and $C_2$ denotes the capacitance of the capacitor 104. If $C_1 \approx C_2$, the total loop capacitance $C_{TOTAL}$ is about one-half of the individual capacitances. When the inductor 106 has a non-zero initial current $I_0$, the loop oscillates like an LC tank circuit, and the voltage $V_{TOTAL}$ across the total capacitance $C_{TOTAL}$ is an alternating current (AC) signal with zero direct current (DC) component. The current $I_L$ through the inductor 106 with an inductance L and the voltage $V_{TOTAL}$ across the total capacitance $C_{TOTAL}$ could be expressed as:

$$I_L(t) = I_0 \times \cos(\omega t) \quad (2)$$

$$V_{TOTAL}(t) = A \times \sin(\omega t) \quad (3)$$

where:

$$\omega = \frac{1}{\sqrt{L \times C_{TOTAL}}} \quad (4)$$

$$A = I_0 \sqrt{\frac{L}{C_{TOTAL}}} . \quad (5)$$

Here, A denotes the overall amplitude of the voltage across the inductor 106 or the series capacitors 102-104.

For the individual capacitors 102-104, they can have non-zero DC voltage values that substantially cancel each other. If $C_1 \approx C_2$ and the DC voltage values in the capacitors 102-104 equal one-half of the overall amplitude A, the voltages $V_{C1}$ and $V_{C2}$ on the capacitors 102-104 can oscillate in a voltage swing range between 0V and A volts with respect to a common ground node between the two capacitors 102-104. The two voltages $V_{C1}$ and $V_{C2}$ are substantially 180° (n radians) out of phase each other. The voltages $V_{C1}$ and $V_{C2}$ could be expressed as:

$$V_{C1}(t) = \frac{A}{2}\sin(\omega t) + \frac{A}{2} \qquad (6)$$

$$V_{C2}(t) = \frac{A}{2}\sin(\omega t - \pi) + \frac{A}{2}. \qquad (7)$$

Here, $V_C(t)-V_{C2}(t)=V_{TOTAL}(t)$. Physically speaking, the electrical potential energy due to the stored charge on the two capacitors 102-104 is in dipole oscillation through the inductor 106 that provides an inertia with its magnetic flux energy for the current flow through it.

The switch 108 represents a bidirectional switch that controls the dipole oscillation loop's oscillation operation. When the switch 108 is closed, the loop is freely oscillating. The voltage on one of the capacitors 102-104 is at its highest peak (such as A volts) and the voltage on the other capacitor 102-104 is at its lowest peak (such as 0V) when the loop current is zero. The switch 108 can be opened when the loop current is substantially zero, which "freezes" the loop operation with the two capacitors 102-104 retaining their respective highest and lowest peak voltages. The loop resumes another phase of the dipole oscillation when the switch 108 is closed.

Because of the loop's "freezing" capability with the use of the switch 108, the circuit in FIG. 1 can be used to drive any suitable capacitive load, such as in gate drivers, beyond autonomous clocks. Even for clocks, this can help to separate the clock frequency or frequencies from the waveform dynamics.

If the capacitance of the capacitor 102 is less than the capacitance of the capacitor 104, $C_1 < C_2$. Let $Q_1$ and $V_1$ denote the charge and voltage on the capacitor 102 when it is at its highest peak and the capacitor 104 is at 0V. Also let $Q_2$ and $V_2$ denote the charge and voltage on the capacitor 104 when it is at its highest peak and the capacitor 102 is at 0V. Due to energy conservation, $Q_1 * V_1/2 = Q_2 * V_2/2$. Because $Q_1 = C_1 * V_1$ and $Q_2 = C_2 * V_2$, the following can be derived: $V_1/V_2 = Q_2/Q_1 = (C_2/C_1)^{1/2}$. As $C_1 < C_2$, $V_1 > V_2$ and $Q_1 < Q_2$. Because of these inequalities, a buck-type operation can be used to transfer electric energy from the capacitor 102 to the capacitor 104, and a boost-type operation can be used to transfer the electric energy from the capacitor 104 to the capacitor 102 as described below.

The switch 110 is provided to implement the buck-type and boost-type operations in the reactive driver 100. The switch 110 could be used as follows. Assume that the capacitance of the capacitor 102 is less than that of the capacitor 104. Also assume that the capacitor 102 is at a positive peak voltage $V_1$, the capacitor 104 is at 0V, and the switches 108 and 110 are opened. That is, the electric energy $C_1 * V_1^2/2$ is on the capacitor 102.

To transfer the electric energy from the capacitor 102 to the capacitor 104, the switch 108 is closed while the switch 110 remains opened. At the completion of transferring the charge $C_1 * V_1$ from the capacitor 102 to the capacitor 104, some magnetic energy may remain in the inductor 106. Thus, as the voltage on the capacitor 102 reaches substantially 0V, the switch 110 is closed so that the loop current continues to flow through the inductor 106. This current bypasses the capacitor 102 and charges the capacitor 104 beyond $C_1 * V_1$ by an extra amount of charge up to $(C_1 * V_1) * ((C_2/C_1)^{1/2} - 1)$. When the loop current becomes zero, the capacitor 104 is fully charged to its peak voltage $V_2$ (which is up to $V_1 * (C_2/C_1)^{1/2}$), and the switch 108 is opened. This is a buck-type operation as the electric energy is essentially transferred from a higher potential $V_1$ to a lower potential $V_2$. The switch 110 may remain closed at this time in preparation for the following phase.

To transfer the electric energy $C_2 * V_2^2/2$ from the capacitor 104 back to the capacitor 102, the switch 108 is closed in addition to the switch 110 for a brief period of time. This spills an amount of charge substantially equal to $(C_2 * V_2) * (1 - (C_1/C_2)^{1/2})$ (which is $|Q_2 - Q_1|$), bypassing the capacitor 102 and energizing the inductor 106. The switch 110 is then opened so that the energized inductor 106 completes transferring the remaining charge on the capacitor 104 to the capacitor 102. When the loop current becomes substantially zero, the capacitor 102 is charged back ideally up to the original voltage $V_1$ (with the capacitor 104 at 0V), and the switch 108 is opened. This is a boost-type operation as electric energy is essentially transferred from a lower potential $V_2$ to a higher potential $V_1$. In this way, the switch 110 is used to "compress" energy into the inductor 106 at the beginning of the boost-type operation and to "decompress" energy from the inductor 106 at the end of the buck-type operation.

Note that the switch 108 may only be switching at zero current to freeze or resume the loop operation with few or no side effects. The duration of the switched-on time for the switch 110 may depend on a mismatching ratio between the capacitors 102-104, as well as on any energy loss in the loop operation. If the capacitances of the capacitors 102-104 are substantially equal and/or the energy loss in the loop operation does not warrant the buck-type operation, a switch 114 can be coupled in parallel with the capacitor 104 to perform the boost-type operation in both directions of the electric energy transfer. It is even possible to combine both types of operations into one that incorporates both the "compressing" and "uncompressing" elements.

The dipole oscillation of the loop may persist in an ideal model, but nontrivial loop parasitics (including the specific on-resistance of the switch 108) can attenuate the loop dynamics. In fact, if the damping factor of the dipole oscillation loop equals or exceeds one, the loop may not even oscillate and, instead, gradually drift towards equilibrium. Therefore, the loop dynamics may eventually die out, and the two capacitors 102-104 may settle at equilibrium with a constant DC potential of A/2 volts. The buck-type and boost-type operations described above may perturb the system dynamics (i.e., increase its entropy), helping to prevent it from entering equilibrium. However, the circuit may continue to lose energy through its operation.

To help restore loop dynamics and sustain full-swing operation of the loop, a renewal circuit 112 can be added to the circuit of FIG. 1. The renewal circuit 112 can inject a certain amount of energy into the circuit, such as by injecting substantially the same amount of energy that is lost during each oscillation cycle back into the circuit at the beginning or end of each cycle. There are various ways of doing this.

In some embodiments, the renewal circuit 112 includes a pull-up transistor connected to one of the two capacitors (such as capacitor 102), where the pull-up transistor refills that capacitor resistively when the loop's charging operation of that capacitor with the inductor 106 is completed. In other embodiments, using the same pull-up transistor, it is possible to refill energy reactively by keeping the pull-up transistor switched on briefly beyond the beginning of the "discharging" phase of that capacitor. The current flowing through the pull-up transistor energizes the inductor 106 more strongly than it would without the pull-up transistor, thereby injecting the extra energy into the loop circuit non-resistively.

In particular embodiments, the switch 108 could be omitted, and the renewal circuit 112 for the dipole oscillation loop could be designed as if the switch 108 is present and remains closed. As a specific example, assume a pull-up transistor in the renewal circuit 112 is on the smaller capacitor 102. Here, the pull-up transistor in the renewal circuit 112 can be switched on when the voltage on the capacitor 102 is around its high peak, and the switch 110 can represent a pull-down transistor and can be switched on when the voltage on the capacitor 102 is around its low peak. It may even be possible to replace both the pull-up transistor and the pull-down switch with a sinusoidal voltage source (such as an amplifier or buffer) to continuously drive the capacitor 102 at or near the dipole loop resonance frequency. A loop with a high Q factor may pose a very high impedance to the driver voltage source (the amplifier or buffer) at resonance, thereby imposing little loading.

In the example shown in FIG. 1, only a single switch 108 (possibly a large switch) may be needed for the main current flow in the loop. Also, zero-current switching (as opposed to peak-current switching in conventional resonant gate drivers) may result in smoother system behavior with fewer side effects. Further, the dipole oscillation tank circuit in FIG. 1 drives two capacitive loads in opposite phases (and an inductive load of the inductor 106) and eliminates the need for specific reference voltages, such as a $V_{DD}/2$ reference voltage node used in conventional resonant-load clocking schemes. In addition, the dipole oscillator can halve the total capacitance compared to a simple LC tank circuit since the capacitors 102-104 are coupled in series, so the dipole oscillator can operate faster and have a higher Q factor than a simple LC oscillator for the same load capacitance and inductance. This can contribute to higher energy efficiency and/or more room for using a smaller inductor in driving a capacitive load reactively.

FIGS. 2 and 3 illustrate other example reactive drivers 200 and 300, which are similar in structure and operation to the reactive driver 100 of FIG. 1. In FIG. 2, the reactive driver 200 includes two capacitors 202-204, an inductor 206, switches 208-210, and a renewal circuit 212. In FIG. 3, the reactive driver 300 includes two capacitors 302-304, an inductor 306, switches 308-310, and a renewal circuit 312. Each of these components may be the same as or similar to the corresponding components in FIG. 1. However, in FIG. 2, the switch 208 is coupled between the capacitor 202 and the inductor 206, and the switch 208 is coupled between the inductor 206 and the switch 210. In FIG. 3, the switch 308 is coupled between the capacitor 302 and the inductor 306, and the switch 308 is coupled between the capacitor 302 and the switch 310.

FIGS. 1 through 3 show three different circuit configurations that contain different permutations of the order of components in the loop. These configurations may have slightly different secondary characteristics, such as different loss factors. When the switch 110 or 210 is closed in FIGS. 1 and 2, the inductor loop current flows to and from ground, and the switch 108 or 208 is in the current path, thereby increasing the loop resistance. The configuration in FIG. 3 avoids that and therefore has a reduced loop resistance. However, the configuration in FIG. 3 has increased parasitic capacitance due to the switches on the "floating" node shared with the inductor 306. If not clamped, this node can oscillate when the switches 308-310 isolate it, causing a small nagging ripple on the capacitor 304. Clamp diodes on the node can suppress the parasitic oscillation (and the ripple), but its parasitic capacitance may contribute to charge and energy losses.

Finally, the switches 108-110, 208-210, 308-310 can be implemented in any suitable manner. For example, the switches 110, 210, 310 could be implemented using NMOS transistors. When the node shared with the inductor 106, 206, 306 is floating, an NMOS transistor used as the switch 108, 208, 308 can have its substrate terminal connected to ground in order to provide a low-clamp diode, thereby suppressing oscillation ripple around 0V. Similarly, a PMOS transistor for the switch 108, 208, 308 could provide a high-clamp diode to suppress oscillation ripple around A volts, provided that the substrate terminal of the PMOS transistor is set equal to or higher than the high peak voltage on the capacitor 104, 204, 304. The switches 108, 208, 308 may need good conduction at the full voltage swing range of the waveform on the capacitor 104, 202, 302. If an NMOS transistor is used for the switch 108, 208, 308, its gate drive voltage is much higher than the high peak voltage of the capacitor 104, 202, 302 for good conduction. A CMOS switch (PMOS and NMOS transistors in parallel) can be used as the switch 108, 208, 308 for good conduction at the full voltage swing range.

Although FIGS. 1 through 3 illustrate three examples of energy-conserving reactive drivers 100-300, various changes may be made to FIGS. 1 through 3. For example, a renewal circuit could be added to any non-grounded node(s) in these figures. As another example, each component in a branch in FIGS. 1 through 3 could be implemented using a single structure or a combination of structures that may be distributed in the branch. Also, the switch 114 in FIG. 1 could be used in either of the circuits in FIGS. 2 and 3. Further, additional components could be added, such as a controller for controlling operation of the switches, where the controller includes any suitable structure for driving transistors or other switches in accordance with a desired control scheme. As another example, non-reactive (i.e., resistive) components could be coupled in series or in parallel with the inductor or the capacitors, contributing to energy loss in the loop operation.

Figure 4:
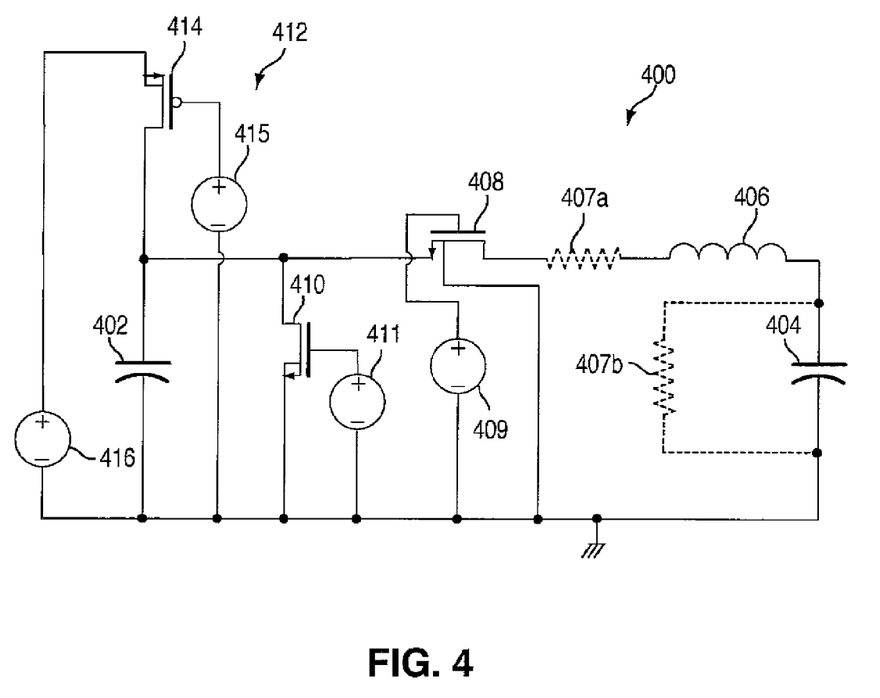
FIGS. 4 and 5 illustrate a specific embodiment of an energy-conserving reactive driver and related operation according to this disclosure.
Figure 5:
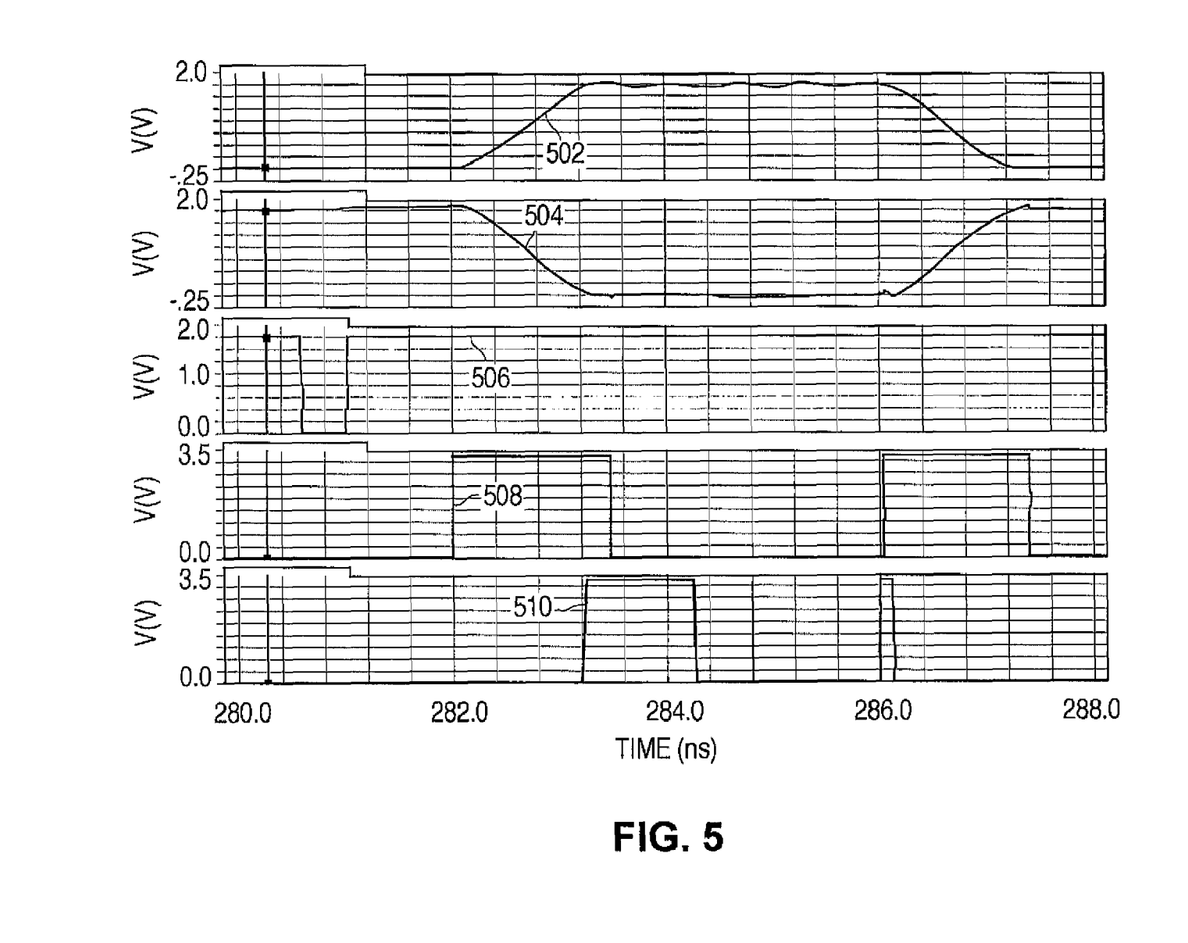

FIGS. 4 and 5 illustrate a specific embodiment of an energy-conserving reactive driver 400 and related operation according to this disclosure. The embodiment of the reactive driver 400 shown in FIG. 4 and its related details shown in FIG. 5 are for illustration only. Other embodiments of the reactive driver 400 could be used without departing from the scope of this disclosure.

As shown in FIG. 4, the reactive driver 400 includes two capacitors 402-404, an inductor 406, one or more optional resistors 407a-407b, and a transistor 408 functioning as a switch coupled in series. The resistor 407a represents an optional non-reactive load that can be coupled in series with the inductor 406. The resistor 407b represents an optional non-reactive load that can be coupled in parallel across one of the capacitors 402-404. The capacitor 402 could represent a 1.5 pF capacitor, the capacitor 404 could represent a 1.8 pF capacitor, the inductor 406 could represent a 240 nH inductor, and the resistors 407a-407b could represent 100 mΩ resistors.

The reactive driver 400 also includes a voltage source 409 that is coupled to the gate of the transistor 408. The voltage source 409 could represent a 3.3V voltage source that outputs a substantially square waveform signal. The reactive driver 400 further includes a transistor 410 functioning as another switch, and a voltage source 411 is coupled to the gate of the transistor 410. The voltage source 411 could represent a 3.3V voltage source that outputs a substantially square waveform signal. The transistors 408 and 410 could represent NMOS transistors, where the substrates of the NMOS transistors are coupled to ground.

In addition, the reactive driver 400 includes a renewal circuit 412 having a transistor 414 functioning as a switch. A voltage source 415 is coupled to the gate of the transistor 414, and a voltage source 416 is coupled to the source of the transistor 414. The voltage source 416 provides energy that is injected into the loop to compensate for energy loss in the loop operation. The transistor 414 could represent a PMOS transistor, the voltage source 415 could represent a 1.8V voltage source that outputs a substantially square waveform signal, and the voltage source 416 could represent a 1.8V DC voltage source coupled to the source terminal of the PMOS transistor 414. In this example, the substrate of the PMOS transistor 414 is also coupled to the voltage source 416.

FIG. 5 illustrates example waveforms associated with simulated operation of the reactive driver 400 in FIG. 4. In FIG. 5, a signal 502 represents the voltage on the capacitor 404, and a signal 504 represents the voltage on the capacitor 402. The signals 506, 508, 510 represent the input signals on the gates of the transistors 414, 408, 410, respectively.

During one phase of a cycle, the capacitor 402 is at approximately 1.825V as shown by the signal 504, before the capacitor 402 is discharged through the transistor 408. After discharging of the capacitor 402 through the inductor 406 to the capacitor 404, the transistor 410 is switched on by the signal 510 for the loop current to continue to flow and charge the capacitor 404, bypassing the capacitor 402, with any magnetic flux energy remaining in the inductor 406. When the charging loop current becomes zero, the transistor 408 is switched off by the signal 508. As shown by the signal 502, the capacitor 404 is charged to approximately 1.69V with a 15 mV amplitude ripple on it.

In another phase of the cycle, a portion of the charge on the capacitor 404 is first spilled flowing through the inductor 406 and the transistors 408 and 410, bypassing the capacitor 402 as shown by the signals 502, 508, 510, thereby energizing the inductor 406 so that the remaining portion of the charge on the capacitor 404 can be subsequently transferred to the capacitor 402 by the inductor 406. Then, the transistor 410 is turned off by the signal 510, and with the energized inductor 406, the capacitor 402 is charged back to approximately 1.72V as shown by the signal 504. When the charging loop current becomes substantially zero, the transistor 408 is switched off as shown by the signal 504.

At the beginning (or end) of the cycle, the capacitor 402 is refill-charged to approximately 1.825V resistively through the transistor 414 as shown by the signals 504 and 506. Note that the cycle can be repeated any number of times to provide a controlled dipole oscillation in the reactive driver 400.

In this particular simulated example, approximately 94.25% of the original charge is recovered on the capacitor 402 in one cycle, and only 5.75% of the charge is replenished from the voltage source 416. Even better performance can be obtained by optimizing the component values in the reactive driver 400.

Although FIGS. 4 and 5 illustrate one specific embodiment of an energy-conserving reactive driver 400 and its related operation, various changes may be made to FIGS. 4 and 5. For example, the component values described above are for illustration only. Also, any other suitable embodiment of the renewal circuit 412 could be used. Further, additional components could be added, such as a controller for controlling operation of the transistors. In particular, the inductor 406 could represent an effective inductance of a transformer, and the resistor 407 could represent an equivalent series resistance for the load(s) on the secondary coil(s) of the transformer. In addition, the simulated behavior of the reactive driver 400 shown in FIG. 5 is for illustration only. The reactive driver 400 could operate in any other suitable manner.

Figure 6:
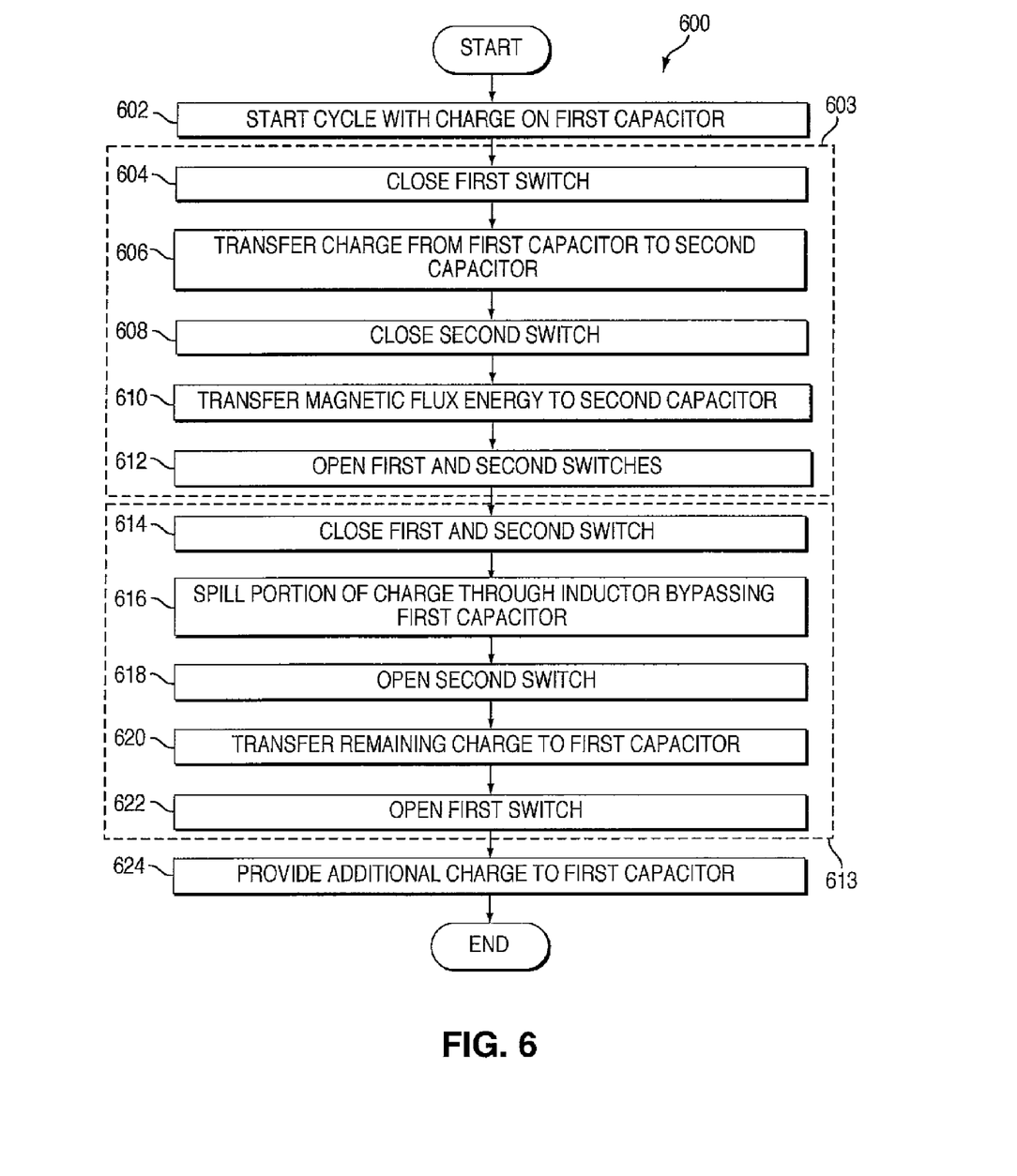
FIG. 6 illustrates an example method for energy-conserving driving of reactive loads according to this disclosure.

FIG. 6 illustrates an example method 600 for energy-conserving driving of reactive loads according to this disclosure. The embodiment of the method 600 shown in FIG. 6 is for illustration only. Other embodiments of the method 600 could be used without departing from the scope of this disclosure. Also, for ease of explanation, the method 600 is described with respect to the reactive driver 400 of FIG. 4. The method 600 could be used with any suitable reactive driver, such as any of the reactive drivers 100-300 shown in FIGS. 1 through 3.

As shown in FIG. 6, one cycle of a dipole oscillation tank circuit operation starts with a charge stored on a first capacitor at step 602. In FIG. 4, an initial charge could be stored on the capacitor 402.

A first portion of the cycle generally denoted at 603 then occurs. In this example, the first portion of the cycle includes closing a first switch at step 604 and transferring the charge on the first capacitor to a second capacitor through an inductor at step 606. This could include, for example, turning on the transistor 408 and transferring the charge on the capacitor 402 to the capacitor 404 through the inductor 406. At some point, such as when the voltage on the first capacitor is close to zero, a second switch is closed at step 608. This could include, for example, turning on the transistor 410. The loop current through the inductor continues to flow to the second capacitor, bypassing the first capacitor at step 610. In this way, any magnetic flux energy remaining in the inductor 406 is transferred to the second capacitor 404. When the loop current becomes substantially zero, the first and second switches are opened at step 612. At this point, the majority of the energy from the first capacitor 402 has been transferred to the second capacitor 404 (except for energy losses), and the transistor 408 (and optionally the transistor 410) has been turned off to freeze the operation of the dipole oscillation tank circuit.

A second portion of the cycle generally denoted at 613 then occurs. In this example, the second portion of the cycle includes closing the first and second switches at step 614, beginning the spillage of a portion of the charge on the second capacitor through the inductor, bypassing the first capacitor and thereby storing the energy in the inductor, at step 616. This could include, for example, turning on the transistor 408 (and the transistor 410 if it has not been turned on) and beginning to spill a portion of the charge on the capacitor 404 through the inductor 406, bypassing the capacitor 402. The spillage current bypassing the capacitor 402 energizes the inductor 406, storing the energy in the form of magnetic flux. The second switch is opened at step 618, and the remaining charge on the second capacitor is transferred to the first capacitor by the inductor at step 620 with the magnetic flux energy previously stored in the inductor (during step 616). This could include, for example, opening the transistor 410 and transferring the rest of the charge on the capacitor 404 to the capacitor 402 using the energized inductor 406. At the end of the charging when the loop current becomes substantially zero, the first switch is opened at step 622. At this point, the majority of the energy from the second capacitor 404 has been transferred to the first capacitor 402 (except for energy losses), and the switch 408 has been turned off to again freeze the operation of the dipole oscillation tank circuit.

An additional charge is provided to the first capacitor at step 624. This could include, for example, turning on the transistor 414 to flow current from the voltage source 416 to the capacitor 402 and then turning off the transistor 414. This provides additional energy to the capacitor 402 during a short refill-charging operation to replenish the lost energy in the first and second portions of the cycle to the dipole oscillation tank circuit. At this point, the method 600 could be repeated during another cycle of the oscillations in the dipole oscillation tank circuit.

Although FIG. 6 illustrates one example of a method 600 for energy-conserving driving of reactive loads, various changes may be made to FIG. 6. For example, a cycle could actually begin at any point in the oscillation, such as when charge is stored on the first capacitor or when charge is stored on the second capacitor. Also, the additional charge can be provided to the first capacitor at any suitable time, such as when a cycle begins or when a cycle ends. In addition, while shown as a series of steps, various steps in FIG. 6 could overlap, occur in parallel, or occur multiple times.

Figure 7:
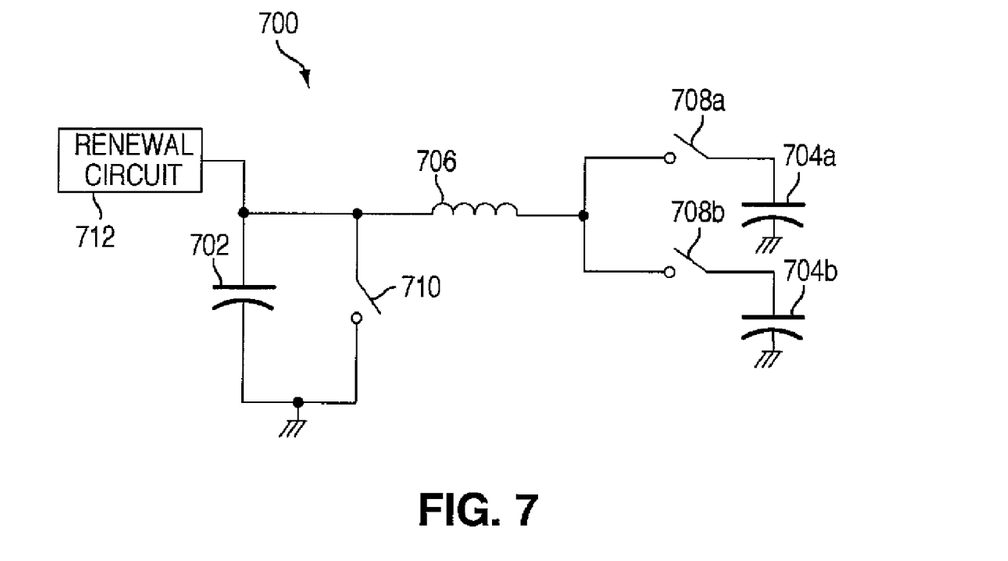
FIG. 7 illustrates an example energy-conserving reactive multiplexed driver according to this disclosure.

FIG. 7 illustrates an example energy-conserving reactive multiplexed driver 700 according to this disclosure. The embodiment of the reactive multiplexed driver 700 shown in FIG. 7 is for illustration only. Other embodiments of the reactive multiplexed driver 700 could be used without departing from the scope of this disclosure.

As shown in FIG. 7, the reactive multiplexed driver 700 includes a first capacitor 702, multiple second capacitors 704a-704b, an inductor 706, multiple switches 708a-708b, a switch 710, and a renewal circuit 712. The driver 700 can support multiplexed "one-hot" driving of multiple capacitive loads (capacitors 704a-704b), such as multiple memory word lines. In this example, the switch 708a is connected in series with the capacitor 704a, forming one branch in the driver 700. This branch can be multiplied (i.e., duplicated) one or more times, and the duplicate branches can be coupled in parallel across the original branch. In FIG. 7, one duplicate branch is formed by the switch 708b that is connected in series with the capacitor 704b, forming another branch in the driver 700. The capacitors 704a-704b in the branches represent multiple capacitive loads, and the rest of the circuit forms a multiplexed driver. FIG. 7 therefore shows a two-load example of this, where the loads (capacitors 704a-704b) and the switches 708a-708b form two load branches. The reactive multiplexed driver 700 can select at most one of the switches 708a-708b in the load branches at a time to drive its associated load (capacitors 704a-704b, respectively) for at least one cycle of the dipole oscillation operation (e.g., from 0V to its peak voltage and then back to 0V), while the switches in the remaining load branches remain turned off.

Although FIG. 7 illustrates one example of an energy-conserving reactive multiplexed driver 700, various changes may be made to FIG. 7. For example, while FIG. 7 illustrates a two-load example, the reactive multiplexed driver 700 could include any number of capacitive load branches.

Figure 8:
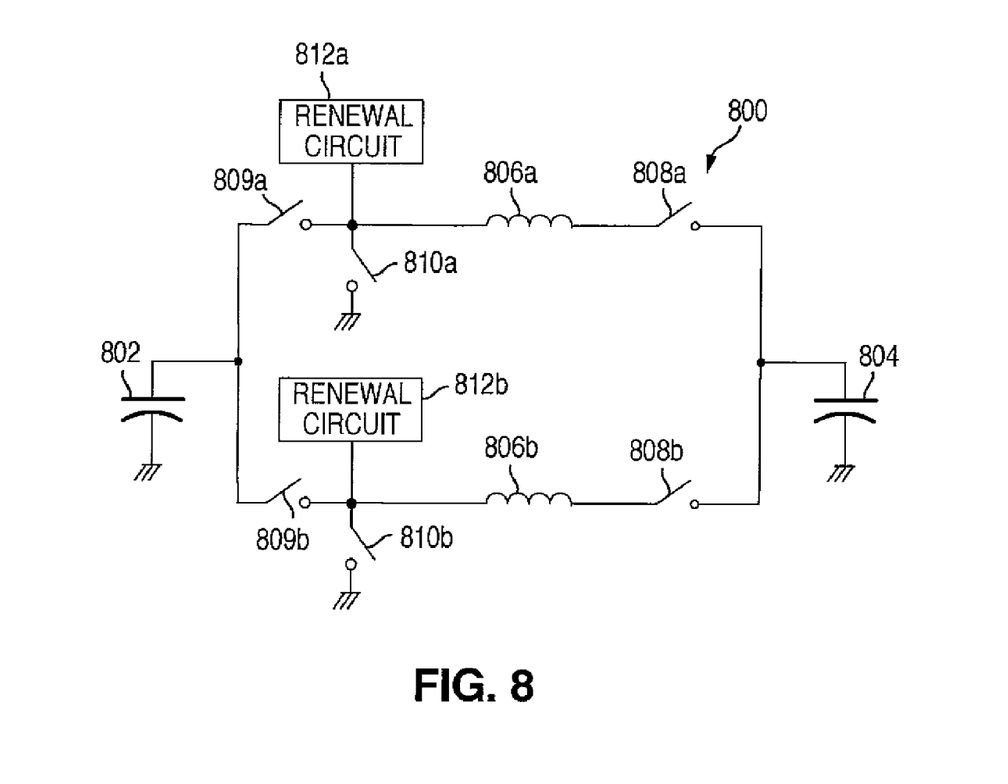
FIG. 8 illustrates an example energy-conserving reactive bus driver according to this disclosure.

FIG. 8 illustrates an example energy-conserving reactive bus driver 800 according to this disclosure. The embodiment of the reactive bus driver 800 shown in FIG. 8 is for illustration only. Other embodiments of the reactive bus driver 800 could be used without departing from the scope of this disclosure.

As shown in FIG. 8, the reactive bus driver 800 includes a first capacitor 802, a second capacitor 804, multiple inductors 806a-806b, multiple switches 808a-808b, multiple additional switches 809a-809b, multiple switches 810a-810b, and multiple renewal circuits 812a-812b. The driver 800 can support "bus" driving of complementary capacitive loads, such as complementary bus lines. In this example, the switch 809a is coupled in series with the capacitor 802 to form one branch in the circuit, and the switch 808a is coupled in series with the capacitor 804 to form another branch in the circuit. These two branches and the inductor 806a form a loop. The switch 810a and the renewal circuit 812a are also connected to the loop, and the resulting circuit (except the capacitors 802-804) constitutes one driver for driving the capacitors 802-804, which are complementary capacitive loads. This driver can be multiplied (i.e., duplicated), and the duplicate drivers can be coupled in parallel across the original driver on their respective terminals. In FIG. 8, one duplicate driver is formed by the switch 809b that is connected in series with the capacitor 802, the switch 808b that is connected in series with the capacitor 804, the inductor 806b, the switch 810b, and the renewal circuit 812b. FIG. 8 therefore shows a two-driver example of this, where the switches 809a-809b, 810a-810b, 808a-808b, the inductors 806a-806b, and the renewal circuits 812a-812b form two drivers for the complementary bus load capacitors 802-804. The reactive bus driver 800 can select at most one driver at a time to connect to the complementary capacitive loads and swap the complementary loads' electrical energy states at least once. For example, the driver 800 can select either the switches 808a and 809a or the switches 808b and 809b to connect one of the drivers in order to change the states of the complementary bus capacitors 802-804 by transferring the electric energy in the charged one to the other.

Although FIG. 8 illustrates one example of an energy-conserving reactive bus driver 800, various changes may be made to FIG. 8. For example, while FIG. 7 illustrates a two-driver example, the reactive bus driver 800 could include any number of drivers.

It may be advantageous to set forth definitions of certain words and phrases that have been used within this patent document. The term "couple" and its derivatives refer to any direct or indirect electrical connection between two or more components, whether or not those components are in physical contact with one another. The phrases "turned on" and "switched on" are synonymous for an electrically conducting state, and the phrases "turned off" and "switched off" are synonymous for a substantially non-conducting state. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A circuit comprising:
   a dipole oscillation tank circuit comprising a first capacitive structure, an inductive structure, and a second capacitive structure connected in series, the dipole oscillation tank circuit configured to repeatedly transfer an electric energy back and forth between the first and second capacitive structures in dipole oscillation cycles;
   a renewal circuit configured to inject energy into the dipole oscillation tank circuit to replenish energy lost during the dipole oscillation cycles; and
   a first switch connected in parallel across the first capacitive structure and in parallel across the inductive structure and the second capacitive structure;
   wherein, during one portion of each dipole oscillation cycle, the first switch is configured to be (i) opened for current to flow through the first capacitive structure and the inductive structure and (ii) closed to bypass the first capacitive structure; and wherein, during another portion of each dipole oscillation cycle, the first switch is configured to be (i) closed to bypass the first capacitive structure and (ii) opened for current to flow through the first capacitive structure and the inductive structure.

2. The circuit of claim 1, further comprising:
a second switch connected in parallel across the second capacitive structure and in parallel across the inductive structure and the first capacitive structure;
wherein, in each portion of the dipole oscillation cycles, (i) one of the switches is closed to bypass one of the capacitive structures, (ii) the one switch is opened, and (iii) the other switch is closed to bypass the other of the capacitive structures.

3. The circuit of claim 1, further comprising:
a second switch connected in series with the first capacitive structure, the inductive structure, and the second capacitive structure;
wherein, in conjunction with the first switch, the second switch is configured to be (i) opened to pause the dipole oscillation cycles and (ii) closed to resume the dipole oscillation cycles.

4. The circuit of claim 3, further comprising:
a third switch connected in parallel across the second capacitive structure and in parallel across the inductive structure and the first capacitive structure;
wherein, in each portion of the dipole oscillation cycles with the second switch closed, (i) one of the first and third switches is closed to bypass one of the capacitive structures, (ii) the one switch is opened, and (iii) the other of the first and third switches is closed to bypass the other of the capacitive structures.

5. The circuit of claim 1, wherein:
the second capacitive structure and a second switch connected in series with the second capacitive structure form one branch in the circuit;
the circuit further comprises one or more additional branches each comprising an additional capacitive structure and an additional switch connected in series;
the branches are coupled in parallel; and
the circuit is configured to close the switch in at most one of the branches to perform at least one of the dipole oscillation cycles while the switches in the remaining branches are opened.

6. The circuit of claim 1, wherein:
the first capacitive structure and a second switch connected in series with the first capacitive structure form one branch in the circuit;
the second capacitive structure and a third switch connected in series with the second capacitive structure form another branch in the circuit;
the first and second capacitive structures comprise complementary capacitive loads, and the switches, the inductive structure, and the renewal circuit form one driver;
the circuit further comprises one or more additional drivers each comprising additional switches, an additional inductive structure, and an additional renewal circuit;
the drivers are coupled in parallel; and
the circuit is configured to operate the switches in at most one of the drivers to swap electrical energy states of the complementary capacitive loads at least once while the switches in the branches of the remaining drivers are opened.

7. The circuit of claim 1, wherein the renewal circuit comprises at least one branch including a voltage source and a second switch connected in series, each branch coupled in parallel across one of the capacitive structures.

8. The circuit of claim 1, further comprising at least one of:
a first non-reactive load coupled in series with the inductive structure; and
a second non-reactive load coupled in parallel with one of the first and second capacitive structures.

9. A system comprising:
a load; and
a reactive driver coupled to the load;
wherein the load and the reactive driver form a dipole oscillation tank circuit comprising a first capacitive structure, an inductive structure, and a second capacitive structure connected in series, the dipole oscillation tank circuit configured to repeatedly transfer an electric energy back and forth between the first capacitive structure and the second capacitive structure in dipole oscillation cycles;
wherein the reactive driver comprises a renewal circuit configured to inject energy into the dipole oscillation tank circuit to replenish energy lost during the dipole oscillation cycles;
wherein the reactive driver comprises a first switch connected in parallel across the first capacitive structure and in parallel across the inductive structure and the second capacitive structure;
wherein, during one portion of each dipole oscillation cycle, the first switch is configured to be (i) opened for current to flow through the first capacitive structure and the inductive structure and (ii) closed to bypass the first capacitive structure; and
wherein, during another portion of each dipole oscillation cycle, the first switch is configured to be (i) closed to bypass the first capacitive structure and (ii) opened for current to flow through the first capacitive structure and the inductive structure.

10. The system of claim 9, wherein the reactive driver further comprises:
a second switch connected in parallel across the second capacitive structure and in parallel across the inductive structure and the first capacitive structure;
wherein, in each portion of the dipole oscillation cycles, (i) one of the switches is closed to bypass one of the capacitive structures, (ii) the one switch is opened, and (iii) the other switch is closed to bypass the other of the capacitive structures.

11. The system of claim 9, wherein the reactive driver further comprises:
a second switch connected in series with the first capacitive structure, the inductive structure, and the second capacitive structure;
wherein, in conjunction with the first switch, the second switch is configured to be (i) opened to pause the dipole oscillation cycles and (ii) closed to resume the dipole oscillation cycles.

12. The system of claim 11, wherein the reactive driver further comprises:
a third switch connected in parallel across the second capacitive structure and in parallel across the inductive structure and the first capacitive structure;
wherein, in each portion of the dipole oscillation cycles with the second switch closed, (i) one of the first and third switches is closed to bypass one of the capacitive structures, (ii) the one switch is opened, and (iii) the other of the first and third switches is closed to bypass the other of the capacitive structures.

13. The system of claim 9, wherein:
the second capacitive structure and a second switch connected in series with the second capacitive structure form one branch in the system;
the system further comprises one or more additional branches each comprising an additional capacitive structure and an additional switch connected in series;
the branches are coupled in parallel; and
the system is configured to close the switch in at most one of the branches to perform at least one of the dipole oscillation cycles while the switches in the remaining branches are opened.

14. The system of claim 9, wherein:
the first capacitive structure and a second switch connected in series with the first capacitive structure form one branch in the system;
the second capacitive structure and a third switch connected in series with the second capacitive structure form another branch in the system;
the first and second capacitive structures comprise complementary capacitive loads, and the switches, the inductive structure, and the renewal circuit form one driver;
the system further comprises one or more additional drivers each comprising additional switches, an additional inductive structure, and an additional renewal circuit;
the drivers are coupled in parallel; and
the system is configured to operate the switches in at most one of the drivers to swap electrical energy states of the complementary capacitive loads at least once while the switches in the branches of the remaining drivers are opened.

15. The system of claim 9, wherein the renewal circuit comprises at least one branch including a voltage source and a second switch connected in series, each branch coupled in parallel across one of the capacitive structures.

16. The system of claim 9, wherein the reactive driver further comprises at least one of:
a first non-reactive load coupled in series with the inductive structure; and
a second non-reactive load coupled in parallel with one of the first and second capacitive structures.

17. A method comprising:
repeatedly transferring an electric energy back and forth between a first capacitive structure and a second capacitive structure via an inductive structure in a dipole oscillation tank circuit during dipole oscillation cycles, each of the dipole oscillation cycles comprising first and second portions;
during the first portion of each dipole oscillation cycle, (i) opening a first switch connected in parallel across the first capacitive structure for current to flow through the first capacitive structure and the inductive structure and (ii) closing the first switch to bypass the first capacitive structure;
during the second portion of each dipole oscillation cycle, (i) closing the first switch to bypass the first capacitive structure and (ii) opening the first switch for current to flow through the first capacitive structure and the inductive structure; and
injecting energy into the dipole oscillation tank circuit to replenish energy lost during the dipole oscillation cycles.

18. The method of claim 17, further comprising:
in conjunction with the first switch, opening a second switch connected in series with the first capacitive structure, the inductive structure, and the second capacitive structure to pause the dipole oscillation cycles.

19. The method of claim 17, wherein:
the second capacitive structure and a second switch connected in series with the second capacitive structure form one branch in the dipole oscillation tank circuit;
the dipole oscillation tank circuit further comprises one or more additional branches each comprising an additional capacitive structure and an additional switch connected in series;
the branches are coupled in parallel; and
the method further comprises closing the switch in at most one of the branches to perform at least one of the dipole oscillation cycles while the switches in the remaining branches are opened.

20. The method of claim 17, wherein:
the first capacitive structure and a second switch connected in series with the first capacitive structure form one branch in the dipole oscillation tank circuit;
the second capacitive structure and a third switch connected in series with the second capacitive structure form another branch in the dipole oscillation tank circuit;
the first and second capacitive structures comprise complementary capacitive loads, and the switches, the inductive structure, and a renewal circuit form one driver;
the dipole oscillation tank circuit further comprises one or more additional drivers each comprising additional switches, an additional inductive structure, and an additional renewal circuit;
the drivers are coupled in parallel; and
the method further comprises operating the switches in at most one of the drivers to swap electrical energy states of the complementary loads at least once while the switches in the branches of the remaining drivers are opened.

* * * * *